(12) United States Patent
Damink

(10) Patent No.: US 10,735,094 B2
(45) Date of Patent: Aug. 4, 2020

(54) OPTICAL RECEIVER FOR AN ILLUMINATION SYSTEM

(75) Inventor: Paulus Henricus Antonius Damink, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 672 days.

(21) Appl. No.: 12/994,901

(22) PCT Filed: Jun. 5, 2009

(86) PCT No.: PCT/IB2009/052380
§ 371 (c)(1),
(2), (4) Date: Nov. 29, 2010

(87) PCT Pub. No.: WO2009/150587
PCT Pub. Date: Dec. 17, 2009

(65) Prior Publication Data
US 2011/0076024 A1    Mar. 31, 2011

(30) Foreign Application Priority Data
Jun. 11, 2008 (EP) .................................. 08158001

(51) Int. Cl.
*H04B 10/116* (2013.01)
(52) U.S. Cl.
CPC .................................. *H04B 10/116* (2013.01)
(58) Field of Classification Search
USPC .......................................... 398/172, 130, 202
See application file for complete search history.

(56) References Cited

U.S. PATENT DOCUMENTS

| 3,243,592 | A | * | 3/1966 | Tomiyasu | .......... H04B 10/1121 178/2 R |
| 3,743,835 | A | * | 7/1973 | Koncen | .......................... 250/352 |
| 4,476,875 | A | * | 10/1984 | Nilsson et al. | ................ 600/479 |
| 4,492,869 | A | * | 1/1985 | Suzuki et al. | ................. 250/367 |
| 4,871,907 | A | * | 10/1989 | Lux | ......................... G01D 5/268 250/231.1 |
| 7,952,292 | B2 | * | 5/2011 | Vegter et al. | ................. 315/153 |

(Continued)

FOREIGN PATENT DOCUMENTS

| JP | 2000188416 A | 7/2000 |
| JP | 2003318836 A | 11/2003 |

(Continued)

OTHER PUBLICATIONS

Hoover et al., "System Design of the Flying Spot Store", Mar. 1959, The Bell System Technical Journal, p. 382.*

(Continued)

*Primary Examiner* — David W Lambert
(74) *Attorney, Agent, or Firm* — Meenakshy Chakravorty

(57) ABSTRACT

The invention relates to an optical receiver for receiving visible light, wherein the visible light comprises an intensity modulated signal. The optical receiver comprises an optical intensity modulation filter configured for filtering the intensity modulated signal from the visible light and a photo detector configured for detecting said filtered modulated signal. The invention also relates to an—illumination system comprising such a optical receiver. The optical filter preferably comprises a fluorescent layer.

17 Claims, 2 Drawing Sheets

(56) References Cited

U.S. PATENT DOCUMENTS

| | | | |
|---|---|---|---|
| 2002/0089722 A1* | 7/2002 | Perkins | G01S 1/70 |
| | | | 398/140 |
| 2006/0056855 A1* | 3/2006 | Nakagawa et al. | 398/183 |
| 2007/0008258 A1 | 1/2007 | Yamamoto | |
| 2007/0103007 A1 | 5/2007 | Miki | |
| 2007/0146126 A1 | 6/2007 | Wang | |
| 2007/0258722 A1 | 11/2007 | Yu | |
| 2008/0063404 A1* | 3/2008 | Broyde | H04B 10/1149 |
| | | | 398/130 |
| 2009/0208213 A1* | 8/2009 | Sarashina | 398/77 |

FOREIGN PATENT DOCUMENTS

| | | |
|---|---|---|
| JP | 2004363756 A | 12/2004 |
| JP | 2006148572 A | 6/2006 |
| WO | 2006111934 A1 | 10/2006 |
| WO | 2007095740 A1 | 8/2007 |
| WO | 2007121574 A1 | 11/2007 |
| WO | WO 2008155697 A2 * | 12/2008 |

OTHER PUBLICATIONS

Langer et al: "Recent Developments in Optical Wireless Communications Using Infrared and Visible Light"; 9th InternationalConference on Transparent Optical Networks, Jul. 2007, pp. 146-151.

* cited by examiner

OPTICAL RECEIVER FOR AN ILLUMINATION SYSTEM

FIELD OF THE INVENTION

The invention relates to an optical receiver for receiving visible light. More specifically, the invention relates to an optical receiver comprising a photo detector configured for detecting an intensity modulated signal in visible light.

BACKGROUND OF THE INVENTION

In recent years, highly advanced illumination systems are being developed in order to enable consumers to obtain a desired ambiance for a particular room or space.

An example of such an illumination system is an arrangement of several light sources in a structure, such as a room, a lobby or a vehicle. The light sources, which may comprise light emitting diodes, emit visible light that carries codes identifying a light source or group of light sources. The light source codes are transmitted by modulating the visible light emitted from the light source. In such an illumination system, an optical receiver for receiving the codes is e.g. implemented in a remote control device or embedded in another device such as a switch or a sensor device. Arranging a camera in a camera position of the structure and registering images of spots of the light allows through the identification of the individual codes which light source contributes to an illumination pattern. The spots can e.g. be illuminated areas on a floor, a wall, or a ceiling. Besides deriving the individual codes from the registered images, a signal processing apparatus may also determine one or more properties of the associated light source, such as the light source position, the light intensity, a color point etc.).

US 2007/0008258 discloses a communication system comprising lighting equipment that has a transmitter comprising multiple light-emitting elements that each emit light of different wavelengths and terminal equipment that has a light receiver comprising multiple light-receiving elements that receive optical signals for each of the different wavelengths. The communication system has a lighting function and is capable of high speed signal transmission. The terminal equipment contains wavelength filters capable of transmitting different wavelengths, such the each light receiving element receives light of a different wavelength.

The communication system of US 2007/0008258 requires the optical receiver to comprise wavelength filters for the light receiving elements in order to detect the light of different wavelengths from the light emitting elements.

There is a need in the art for an optical receiver and an illumination system of reduced complexity.

SUMMARY OF THE INVENTION

An optical receiver for receiving visible light is proposed, wherein the visible light comprises an intensity modulated signal. The optical receiver comprises an optical intensity modulation filter configured for filtering the intensity modulated signal from the visible light and a photo detector configured for detecting said filtered modulated signal.

Furthermore, an illumination system is proposed that is configured for emitting visible light by a plurality of light sources. The system comprises a modulator configured for generating a modulated signal for the visible light to provide identification codes for the light sources. The illumination system comprises the optical receiver of the previous paragraph.

By applying an optical intensity modulation filter configured for filtering the intensity modulated signal from the visible light (i.e. a filter tuned to filter on the basis of the frequency of intensity modulations of the visible light), neither wavelength filters nor light sources for emitting optical signals of different wavelengths are required. Consequently, an optical receiver and an illumination system of reduced complexity are obtained.

It should be appreciated that the optical intensity modulation filter may be a broadband filter, i.e. a filter capable of passing visible light over a significant spectral range or a narrow band, low pass or high pass filter, i.e. a filter capable of passing light only over a limited spectral range (e.g. using a wavelength filter in addition to the optical intensity modulation filter or a optical intensity modulation filter having a material composition responding only to signals of a particular spectral range).

Although for user interaction functions in the illumination system high speed communication may be desirable, lower speed communication may be sufficient for devices for which a fast response is not required, such as embedded devices in sensors or switches. An embodiment provides for an optical receiver, wherein the photo detector substantially receives a low frequency, intensity modulated signal. The embodiment does not require a costly electrical filter, such as an anti-aliasing filter. Moreover, an eventual electrical amplifier for the optical receiver may be a low-speed, low cost, amplifier.

An embodiment provides for an easy and inexpensive implementation of the optical filter in the optical receiver. The optical filter layer may comprise multiple sub-layers.

Various embodiments provide for a particularly suitable optical filter layer to obtain an appropriate signal to noise ratio, viz. a fluorescent layer. The fluorescent layer has a thickness in the range of 100-300 m. The layer preferably comprises a phosphor material, although other materials for fluorescent layers are not excluded. The light impinging on the phosphor material layer will trigger a fluorescent reaction and the modulated excited light of the reaction will subsequently be detected by the photo detector. In particular, the fluorescent layer will be able to respond to a signal with a low intensity modulation frequency, e.g. 10 Hz or lower, while the layer will generally fail to follow the higher frequency intensity modulations, thereby ensuring selective passing of the low frequency intensity modulation signal. By tuning the fluorescent time decay constant of the layer, the cutoff frequency can be determined.

An embodiment provides for the advantage that the photo current of the photo diode is an adequate measure of the received filtered signal.

An embodiment is advantageous in that non-modulated signals from the photo detector, e.g. a DC current of a photo diode, are effectively blocked by the high pass filter. The non-modulated signals result from ambient light received by the photo detector. Moreover, the non-modulated signals may result from high frequency intensity modulated signals that have been blocked by the optical intensity modulation filter, such as high frequency modulated signals.

Hereinafter, an embodiment of the invention will be described in further detail. It should be appreciated, however, that this embodiment may not be construed as limiting the scope of protection for the present invention.

DETAILED DESCRIPTION OF THE DRAWINGS

Figure 1:
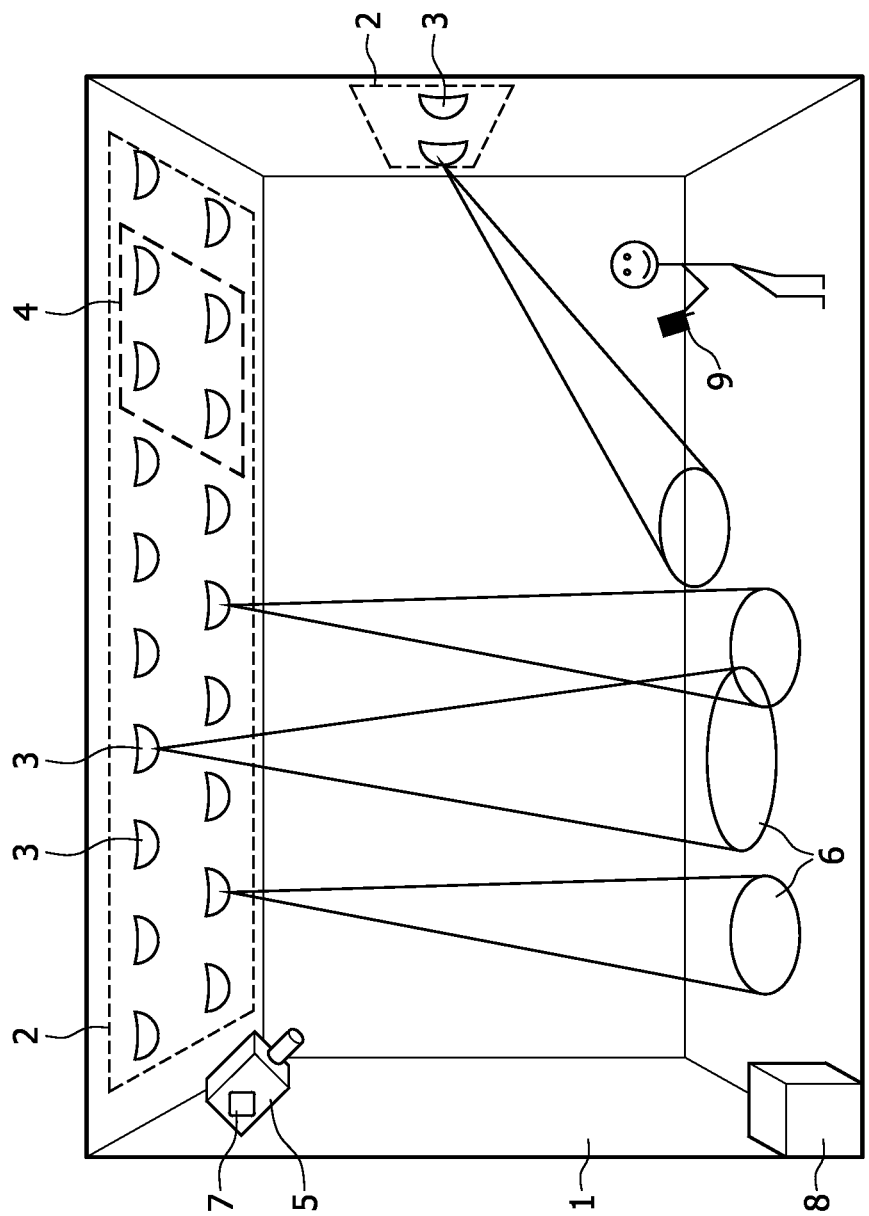
FIG. 1 is a schematic illustration of an illumination system installed in a structure according to an embodiment of the invention.

FIG. 1 shows a structure 1—in this case a room—with an installed illumination system 2. The illumination system 2 comprises a plurality of light sources 3, provided with an encoder (see FIG. 2) arranged to enable light emitted from the light sources 3 to comprise light source identification codes. The light source 3 may e.g. be high/low pressure gas discharge bulbs, inorganic/organic light emitting diodes, or laser diodes. Possibly several light sources 3 may be combined in a light module 4.

The illumination system further comprises a camera 5 placed in the structure 1 enabling it to register images of illumination spots 6 of the light emitted from the light sources 3. A signal processor 7, that is e.g. incorporated in the camera 5 or in a master controller 8 of the illumination system 2, is arranged to derive the light source identification codes from registered images. Through the determination of the light source identification codes, it is possible to correlate the light sources 3 with the foot print of their illumination spots 6. Making this correlation, also known as light effect commissioning, enables a user to intuitively create illumination atmospheres using a remote control device 9 comprising an optical receiver (see FIG. 3). The remote control device 9 interacts with the system for instance through a wireless RF link with e.g. the master controller 8.

Figure 2:
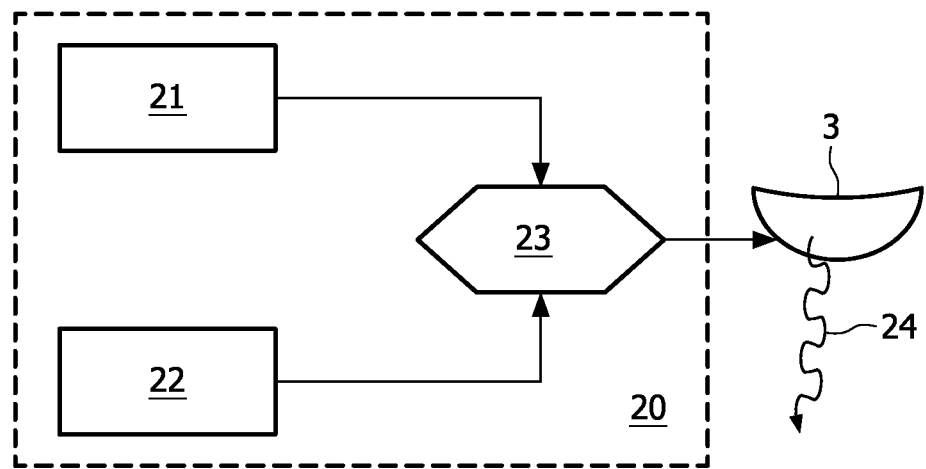
FIG. 2 is a schematic illustration of an embodiment for providing visible light from a light source with a low frequency modulated signal.

FIG. 2 is a schematic illustration of an embodiment for encoding visible light with an identification code using low frequency modulation. An encoder 20 is arranged to combine a driving signal from a light signal generator 21 for the light source 3 with a slow code signal from a slow code signal generator 22 using a combiner 23. The signal from the combiner 23 is fed to a driver (not shown) of the light source 3 to obtain visible light 24 with a low frequency intensity modulated signal. Preferably, the slow code signal is clocked below 10 Hz. Advantageously, this allows the light modulations to be practically invisible for the human eye.

The slow code may e.g. be implemented in the visible light using a spread spectrum technique. Such a technique is known as "code-division multiplexing/multiple access" (CDM or CDMA). To each lighting source 3, or to each group of one or more light sources 3, a unique code is allocated. The codes may be orthogonal, that is, a value of an autocorrelation of a code must be significant higher than a value of a cross-correlation of two different codes. A sensing device, such as the camera 5 or the optical receiver in the remote control 9, is then able to discriminate between simultaneous transmissions of modulated light by different light sources 3, so that the sensing device can identify each of them. Furthermore, the sensing device can measure a lighting property (intensity, color point, etc) of the modulated light received from the identified light source 3.

For each sensed emission of modulated light the optical receiver transfers data containing an identification of the emitting light source 3 and a value of the measured lighting property to the master controller 8. Having acquired such data the master controller 8 is able to control light sources 3, changing the intensity or color point of the light emitted to meet the desired light effects in an area around the sensing device.

Figure 3:
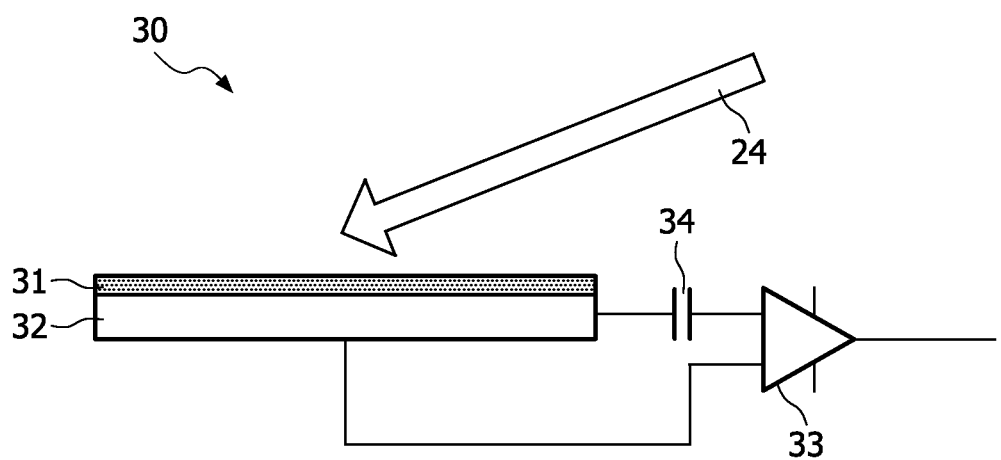
FIG. 3 is a schematic illustration of an optical receiver according to an embodiment of the invention.

FIG. 3 provides a schematic illustration of an optical receiver 30 that may e.g. be implemented in the remote control device 9 or another device.

The optical receiver 30 comprises an optical intensity modulation filter 31 configured for receiving the intensity modulated visible light 24 and filtering the intensity modulated signal from the visible light. The filtered light is subsequently detected by a photo detector 32.

The optical filter 31 is provided as a layer or plurality of layers applied on or over the photo detector 32. The layer has a thickness in the range of 100-300 μm and comprises fluorescent material, such as a phosphor material. Such a layer is capable of responding to the slow intensity modulations of the visible light 24 comprising the identification codes and providing an associated modulating signal to the photo detector 32. Non-modulated signals (resulting e.g. from ambient light) or signals with a high frequency intensity modulation (e.g. fast code signals in the visible light 24) to which the optical filter 31 cannot respond will be transferred to the photo detector 32 as a DC signal.

The photo detector 32 comprises a photo diode receiving the filtered signal from the optical intensity modulation filter 31. The photo current from the photo diode can be amplified by a low cost amplifier 33. The capacitor 34 ensures that the DC signal is not amplified.

The invention claimed is:

1. An optical receiver for receiving visible light emitted by a light source, the optical receiver comprising:
    an optical intensity modulation filter configured to filter an intensity modulated signal from the visible light by distinguishing a first modulation frequency at which intensity of at least one carrier wave of the visible light is modulated in accordance with the intensity modulated signal from at least one other intensity modulation frequency of said at least one carrier wave, wherein the intensity modulated signal comprises an identification code modulating the visible light for identifying the light source; and
    a photo detector that detects the filtered intensity modulated signal.

2. The optical receiver according to claim 1, wherein said first modulation frequency is 10 Hz or lower and said optical intensity modulation filter is configured for filtering out intensity modulation frequencies above 10 Hz.

3. The optical receiver according to claim 1, wherein said optical intensity modulation filter comprises a layer deposited on said photo detector.

4. The optical receiver according to claim 3, wherein said layer comprises a fluorescent layer.

5. The optical receiver according to claim 4, wherein the fluorescent layer comprises a phosphor material.

6. The optical receiver according to claim 5, wherein a fluorescence time decay constant of said phosphor material is tuned to said first modulation frequency such that the fluorescent layer is non-responsive to said at least one other intensity modulation frequency.

7. The optical receiver according to claim 1, wherein said photo detector comprises a photo diode.

8. The optical receiver according to claim 1, wherein said photo detector is connected to a high pass filter.

9. An illumination system, comprising:
a plurality of light sources configured for emitting visible light;
a modulator configured for generating an intensity modulated signal in the visible light to provide an identification code in the intensity modulated signal for identifying one or more of the light sources; and
an optical receiver configured for receiving the visible light, including the intensity modulated signal, the optical receiver comprising:
 an optical intensity modulation filter configured to filter the intensity modulated signal from the visible light by distinguishing a first modulation frequency at which intensity of at least one carrier wave of the visible light is modulated in accordance with the intensity modulated signal from at least one other intensity modulation frequency of said at least one carrier wave; and
 a photo detector that detects the filtered intensity modulated signal.

10. The illumination system according to claim 9, wherein said first modulation frequency is 10 Hz or lower.

11. The illumination system according to claim 9, wherein said optical intensity modulation filter is configured for filtering out intensity modulation frequencies above 10 Hz.

12. The illumination system according to claim 9, wherein said optical intensity modulation filter comprises a fluorescent layer comprising a phosphor material deposited on said photo detector.

13. The illumination system according to claim 12, wherein a fluorescence time decay constant of said phosphor material is tuned to said first modulation frequency such that the fluorescent layer is non-responsive to said at least one other intensity modulation frequency.

14. The optical receiver according to claim 5, wherein the fluorescent layer has a thickness in the range of 100-300 µm.

15. The illumination system according to claim 9, wherein the modulator comprises:
a light signal generator configured for generating a driving signal;
a slow code signal generator configured for generating a slow code signal to provide the identification code; and
a combiner configured for combining the driving signal from the light signal generator and the slow code signal from the slow code signal generator for providing the visible light comprising the intensity modulated signal.

16. The optical receiver according to claim 1, wherein the at least one carrier wave is a plurality of carrier waves and wherein the intensity modulated signal is implemented in said plurality of carrier waves in accordance with a spread spectrum technique.

17. The illumination system according to claim 9, wherein the at least one carrier wave is a plurality of carrier waves and wherein the intensity modulated signal is implemented in said plurality of carrier waves in accordance with a spread spectrum technique.

* * * * *